(12) United States Patent
Tung et al.

(10) Patent No.: US 8,810,730 B2
(45) Date of Patent: Aug. 19, 2014

(54) RECEIVING DEVICE FOR AUDIO-VIDEO SYSTEM

(75) Inventors: Hsu-Jung Tung, Kaohsiung (TW); Tzuo-Bo Lin, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1606 days.

(21) Appl. No.: 11/937,108

(22) Filed: Nov. 8, 2007

(65) Prior Publication Data

US 2008/0111921 A1      May 15, 2008

(30) Foreign Application Priority Data

Nov. 9, 2006   (TW) ................................ 95141541 A (51) Int. Cl.
| | |
|---|---|
| H04N 5/00 | (2011.01) |
| H04N 5/60 | (2006.01) |
| H04N 3/27 | (2006.01) |
| H04N 5/268 | (2006.01) |
| H04N 21/4402 | (2011.01) |
| H04N 21/439 | (2011.01) |
| H04N 21/44 | (2011.01) |
| H04N 5/44 | (2011.01) |

(52) U.S. Cl.
CPC ............. *H04N 5/44* (2013.01); *H04N 21/4402* (2013.01); *H04N 21/4396* (2013.01); *H04N 21/44008* (2013.01); *H04N 21/4394* (2013.01)
USPC ............ 348/607; 348/738; 348/554; 348/705

(58) Field of Classification Search
USPC .......................... 348/180–194, 553–570, 909
See application file for complete search history.

(56) References Cited

U.S. PATENT DOCUMENTS

| | | | | |
|---|---|---|---|---|
| 4,135,182 | A * | 1/1979 | Bell et al. ....................... | 348/720 |
| 4,673,826 | A * | 6/1987 | Masson ........................... | 307/66 |
| 4,837,623 | A | 6/1989 | Motoyama | |
| 6,525,775 | B1 | 2/2003 | Kahn et al. | |
| 2004/0054707 | A1* | 3/2004 | Yamada ......................... | 708/620 |
| 2005/0055473 | A1* | 3/2005 | Frank et al. ..................... | 710/15 |
| 2005/0190210 | A1* | 9/2005 | Abe et al. ....................... | 346/101 |
| 2005/0259948 | A1* | 11/2005 | Ando .............................. | 386/46 |
| 2006/0095623 | A1* | 5/2006 | Nio et al. ....................... | 710/260 |
| 2007/0050063 | A1 | 3/2007 | Tung et al. | |
| 2007/0153132 | A1* | 7/2007 | Jong .............................. | 348/705 |
| 2007/0190857 | A1* | 8/2007 | Galang et al. ................. | 439/607 |

FOREIGN PATENT DOCUMENTS

TW           454417          9/2001

\* cited by examiner

*Primary Examiner* — Jason K Lin
(74) *Attorney, Agent, or Firm* — McClure, Qualey & Rodack, LLP (57) ABSTRACT

The invention relates to a receiving device for an audio-video system. The receiving device comprises a connector, a video processing unit, an audio processing module, and a monitoring unit. The monitoring unit detects a status of an inputted signal received by the connector and controls the operation of at lease one of the video processing unit and the audio processing module in accordance with the detected result to avoid the audio-video system display abnormal image or play noise when the receiving device did not receive the inputted signal by accident.

16 Claims, 7 Drawing Sheets

RECEIVING DEVICE FOR AUDIO-VIDEO SYSTEM

BACKGROUND OF THE INVENTION

1. Field of Invention

The invention relates to an audio-video system, and in particular, to a receiving device for audio-video system.

2. Related Art

At the present day, digital audio-video systems have become a popular electric product for information and entertainment ends. Especially when audio-video applications developed a need for digitization and high definition, in order to transmit the large amount of the audio-video signal, developers start to adopt high-speed interface standards with digitized serial link format, for example, High Definition Multimedia Interface (HDMI).

End users are usually met with one problem of the conventional audio-video system: that is, if the connector of the cable for connecting signal sources such as DVD players, or display devices such as digital televisions, accidentally disconnects from either, or the receiving device of an audio-video system, for any possible reason, stops receiving the inputted signal from the transmitting device of the audio-video system, unexpected non-content image may be viewed or unpleasant noise may be heard. Such non-content image or noise is undesirable. The undesirable image or noise results from incomplete signal reception due to interrupted input signal, which causes incompleteness and abrupt variation of video data and audio data. Such abnormal image and noise usually impose unpleasant effect upon users' viewing and hearing experience.

SUMMARY OF THE INVENTION

Accordingly, it is an object of the present invention to provide a receiving device for an audio-video system, which can detect a condition whether an inputted signal is being received, and display certain image when it is detected that the inputted signal is suddenly stopped from being received, to avoid display of abnormal image.

Another object of the present invention is to provide a receiving device for an audio-video system which can detect a condition whether an inputted signal is being received or not, and play certain audible signal when it is detected that the inputted signal is suddenly stopped from being received, to avoid broadcast of undesirable noise.

The receiving device of the present invention is installed in an audio-video system and includes a connector for receiving an inputted signal; a video processing unit for processing video data included in the inputted signal; an audio processing module for processing audio data included in the inputted signal; a monitoring unit for detecting a status of the inputted signal received by the connector and controlling the operation of at least one of the video processing unit and the audio processing module to display predetermined image and play corresponding sound in accordance with the detected result for avoiding the audio-video system displaying abnormal image or playing noise when the receiving device is stopped from receiving the inputted signal by accident.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The present invention provides a monitoring unit installed in a receiving device of an audio-video system, for real-time detecting a status of an inputted signal and executing the operation corresponding to the inputted signal in accordance with the detected result of the inputted signal. It should be noted that although the embodiments of the present invention are illustrated with High Definition Multimedia Interface (HDMI) as examples, it should be readily appreciated by those of ordinary skill in the pertinent art that the field of application of the present invention is not limited thereto. Transmission interfaces with wide bandwidth of digitized format and serial link integrated with video data and audio data, which are either currently used or will be developed in the future, can all adopt the present invention, such as HDMI, Display Port established by Video Electronics Standards Association (VESA), or Unified Display Interface (UDI).

The transmitted information or signal, which conforms to standards such as HDMI or other high-speed transmission interface, usually includes components such as digital video data, digital audio data, clock information, or other auxiliary information, among which also include certain DC-biasing voltage, for example, in the case of HDMI, a +5V HPD (Hot Plug Detection) DC-biasing voltage. In the following embodiments of the present invention, the characteristics or states of aforementioned components of the signal received by the receiving device are detected to decide the connection status of the connector or the interruption of the inputted signal.

Figure 1:
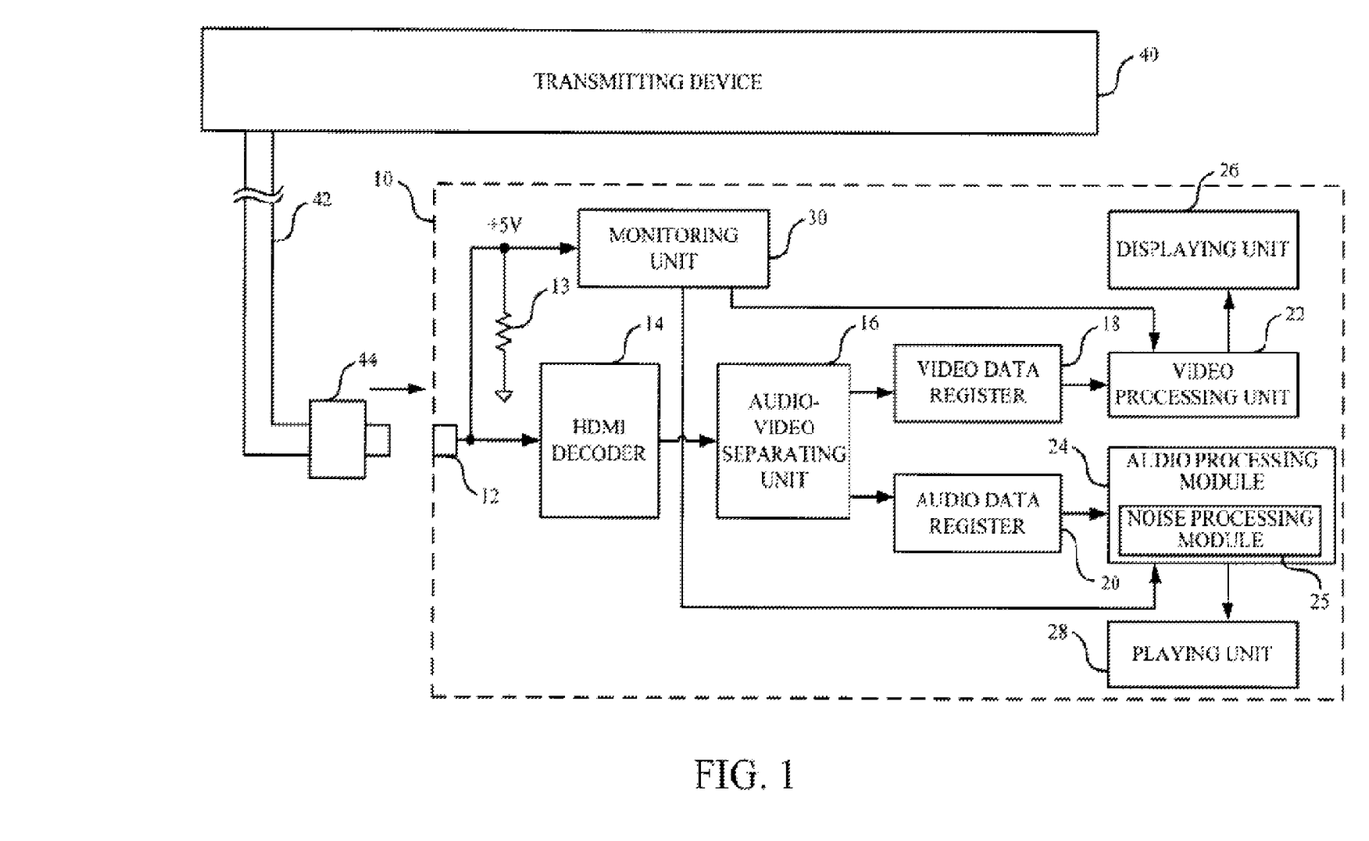
FIG. 1 shows a block diagram of an embodiment of the receiving device of the present invention.

FIG. 1 shows a block diagram of an embodiment of the receiving device of the present invention. As shown in FIG. 1, the HDMI audio-video system includes a receiving device 10 for receiving an inputted signal transmitted from a transmitting device 40 of the HDMI audio-video system. The inputted signal comprises audio data and video data. The transmitting device 40 includes a cable 42, wherein one terminal of the cable 42 has a connector 44 for connecting to a connector 12 of the receiving device 10. The transmitting device 40 transmits the inputted signal to the receiving device 10 via the transmitting cable 42 and the two connectors 44, 12, so that the receiving device 10 can process the inputted signal to display video images and play audio sound. The aforementioned transmitting cable 42 and the two connectors 44, 12 all conform to the HDMI standard.

Again referring to the FIG. 1, the receiving device 10 includes a high definition multimedia interface (HDMI) decoder 14, an audio-video separating unit 16, a video data register 18, an audio data register 20, a video processing unit 22, an audio processing module 24, a video displaying unit 26, and an audio playing unit 28. The HDMI decoder 14 receives the inputted signal transmitted from the connector 12, decodes the inputted signal, and transmits the decoded signal to the audio-video separating unit 16. The audio-video separating unit 16 separates the decoded signal from the HDMI decoder 14 to generate video data and audio data. The video data and the audio data are transmitted to the video data register 18 and the audio data register 20, respectively.

The video data register 18 is for storing the video data transmitted from the audio-video separating unit 16. The video processing unit 22 can read the video data stored in the video data register 18 so as to generate an output video signal, and transmit the output video signal to the displaying unit 26. The audio data register 20 is for storing the audio data transmitted from the audio-video separating unit 16. The audio processing module 24 can read the audio data stored in the audio data register 20 so as to generate an output audio signal, and transmit the output audio signal to the playing unit 28. In the present embodiment, the video data register 18 and the audio data register 20 are both a first-input-first-output (FIFO) register.

In the present embodiment, in order to determine that the connector 44 of the transmitting device 40 is indeed connected with the connector 12 of the receiving device 10, and that the inputted data is being transmitted to the receiving device 10, the receiving device 10 includes a monitoring unit 30. Since the connector 44 transmits a +5V DC-biasing signal (for example, the HPD signal) to the receiving device 10 under normal operation of the transmitting device 40, the monitoring unit 30 detects the connection status between the two connectors 44, 12 according to this DC-biasing signal. In the present embodiment, a resister 13 is coupled to said DC-biasing signal in the connector 12 and to the monitoring unit 30 so that the monitoring unit 30 can monitor a voltage level of the DC-biasing signal to identify the connection status between the two connectors 44, 12.

Furthermore, if the monitoring unit 30 fails to detect the DC-biasing signal, for example, by detecting a voltage level far less than +5V or a floating level, it indicates that the connector 44 is not connected to the connector 12, or the transmitting device 40 does not operate normally. At this moment, the receiving device 10 cannot receive the inputted signal normally, and the video data and the audio data vary drastically and discontinuously, so that abnormal image tends to be displayed and noise played. Therefore, when the monitoring unit 30 fails to detect the DC-biasing signal, the monitoring unit 30 will transmit a control signal to the video processing unit 22, and the video processing unit 22 will accordingly transmit a predetermined video signal to the displaying unit 26. The predetermined video signal can be a black screen, a blue screen, or an on screen display (OSD) signal, so that the abnormal image caused by the receiving device 10's failing to receive the inputted signal can be avoided from being shown on the screen, and users can be notified the unusual status of the receiving device 10, who can then examine the connection status.

The monitoring unit 30 also transmits a control signal to the audio processing module 24 so that the audio processing module 24 can transmit a corresponding audio signal to the playing unit 28. By doing so, when the receiving device 10 accidentally does not receive the inputted signal and the audio data of the inputted signal is interrupted, unpleasant noise can be avoided from being played. The audio processing module 24 can also, when receiving the control signal from the monitoring unit 30, output the audio signal currently being outputted when the interruption occurs as the corresponding output signal to the playing unit 28 to avoid playing the noise. Furthermore, a noise processing module 25 can be further included in the audio processing module 24 for processing the audio signal accidentally being interrupted and generating a continual output audio signal to the playing unit 28 so that the noise can be avoided.

Figure 2:
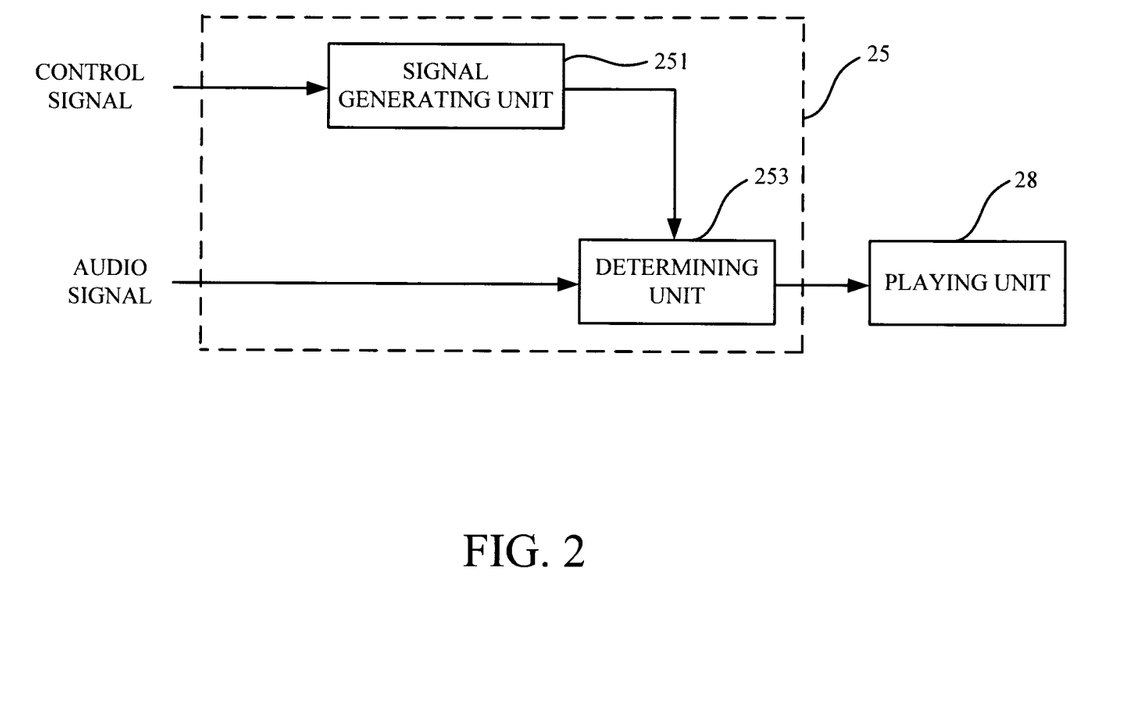
FIG. 2 shows a block diagram of an embodiment of the noise processing module of the present invention.

FIG. 2 shows a block diagram of an embodiment of the noise processing module 25 of the present invention. As shown in FIG. 2, the noise processing module 25 includes a signal generating unit 251 and a determining unit 253. The signal generating unit 251 receives the control signal transmitted from the monitoring unit 30, generates an adjusting signal corresponding to the control signal, and transmits the adjusting signal to the determining unit 253. The determining unit 253 transmits an audio signal to the playing unit 28 in accordance with the adjusting signal and the output audio signal generated by the audio processing module 24. The adjusting signal generated by the signal generating unit 251 can be a linear or non-linear signal. The determining unit 253 generates the audio signal in accordance with the linear or non-linear signal and smoothens the audio signal with discontinuous waveform, to generate the continual audio signal.

The aforementioned linear signal can be a signal with linearly reduced gain within a predetermined time frame, and the aforementioned non-linear signal can be a signal corresponding to any combination of trigonometric functions or corresponding to a window function. An example of the window function is a Hanning Window function. An example of the determining unit 253 is a multiplier. The gain value of the audio signal generated by the noise processing module 25 is gradually reduced so that the signal transmitted to the playing unit 28 will not cause the noise when playing. When receiving the control signal transmitted from the monitoring unit 30, the audio processing module 24 can continuously read and process the audio data stored in the audio data register 20 and the noise processing module 25 of the audio processing module 24 can process the audio signal processed by the [[he]] audio processing module 24, to generate the audio signal. Alternatively, the audio processing module 24 maintains the audio signal currently being outputted after receiving the control signal, and the noise processing module 25 processes the maintained audio signal to generate the audio signal.

Figure 3A:
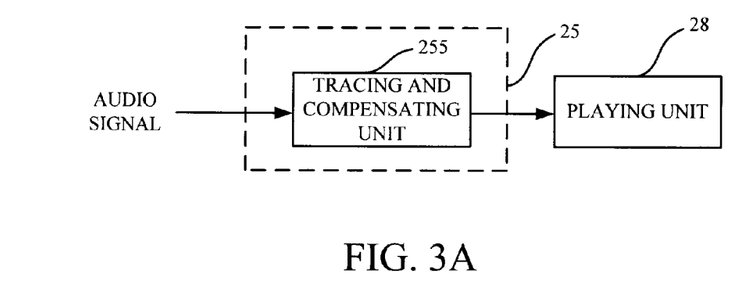
FIG. 3A shows a block diagram of another embodiment of the noise processing module of the present invention.

FIG. 3A shows a block diagram of another embodiment of the noise processing module of the present invention. As shown in FIG. 3A, the noise processing module 25 includes a tracing and compensating unit 255, which can be realized by a proportional controlling unit, an integral controlling unit, a differential controlling unit or combinations thereof. The tracing and compensating unit 255 is controlled by the control signal and generates the audio signal in accordance with the difference between the audio signal generated by the audio processing module 24 and the audio signal outputted from the tracing and compensating unit 255 itself. The aforementioned proportional controlling unit, integral controlling unit, and differential controlling unit are well known to those of ordinary skill in the pertinent art, and detailed description thereof is thus herein omitted.

Figure 3B:
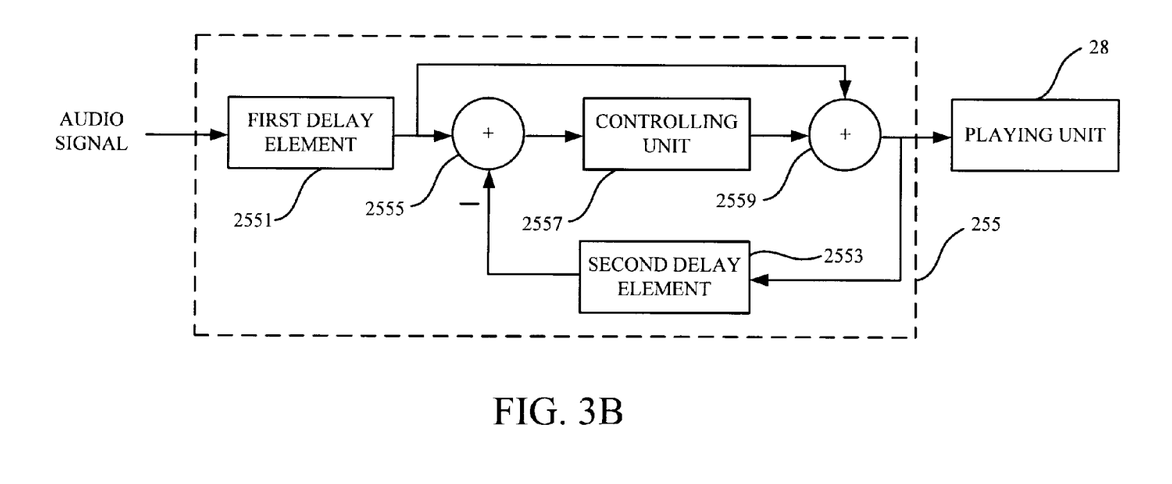
FIG. 3B shows a block diagram of an embodiment of the tracing and compensating unit of the present invention.

FIG. 3B shows a block diagram of an embodiment of the tracing and compensating unit of the present invention. As shown in FIG. 3B, the tracing and compensating unit 255 includes a first delay element 2551, a second delay element 2553, a first addition element 2555, a controlling unit 2557, and a second addition element 2559. The controlling unit 2557 can be a proportional controlling unit, an integral controlling unit, a differential controlling unit, or combinations thereof. The first delay element 2551 receives and delays the audio signal generated by the audio processing module 24, and generates a first delay audio signal. The second delay element 2553 receives and delays the audio signal generated by the tracing and compensating unit 255, and generates a second delay audio signal. The first addition element 2555 generates an error signal by subtracting the second delay audio signal from the first delay audio signal. The controlling unit 2557 generates a compensation signal in accordance with the error signal and a gain value of the controlling unit 2557. The second addition element 2559 generates the outputted audio signal for playing in accordance with the first delay audio signal and the compensation signal.

Figure 4:
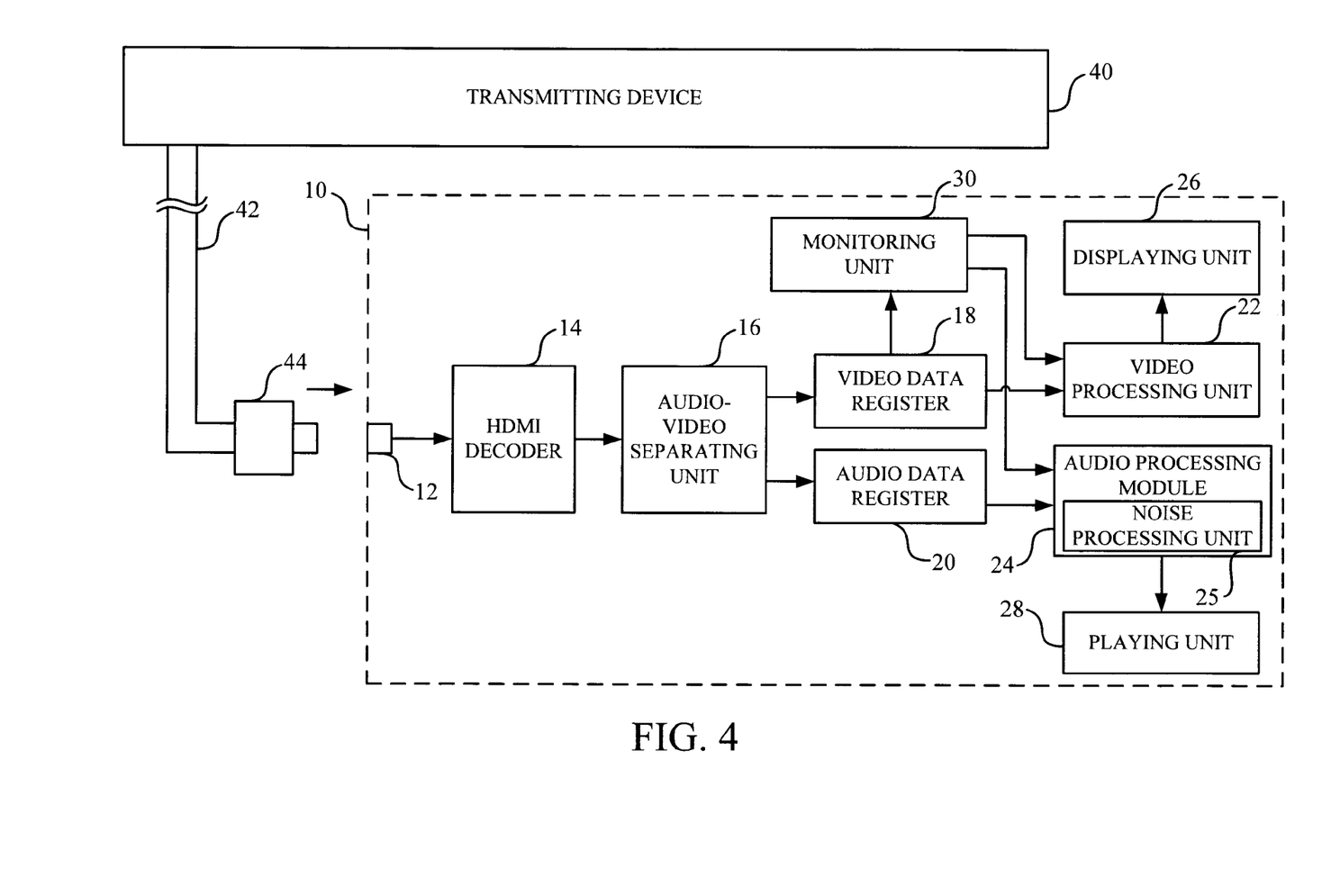
FIG. 4 shows a block diagram of another embodiment of the receiving device of the present invention.

FIG. 4 shows a block diagram of another embodiment of the receiving device 10 of the present invention. The difference between the embodiments shown in FIGS. 4 and 1 lies in that the monitoring unit 30 shown in FIG. 4 detects the status of the video data register 18 in determining whether the receiving device 10 receives the inputted signal or not. If the monitoring unit 30 detects that some addresses of the video data register 18 are not occupied with video data, the monitoring unit 30 determines that the connector 44 of the transmitting device 40 is disconnected from the connector 12 of the receiving device 10, or the transmitting device 40 fails to operate normally so that the receiving device 10 cannot receive the inputted signal. At this moment, the monitoring unit 30 transmits a control signal to the video processing unit 22 and the audio processing module 24 to generate a corresponding video signal and a corresponding audio signal, and to transmit the signals to the displaying unit 26 and the playing unit 28 for displaying video image and playing audio sound, respectively. By doing so, displaying of abnormal image and playing of noise can be avoided. The way that the video processing unit 22 and the audio processing module 24 of this embodiment generate the corresponding outputted video signal and outputted audio signal is the same as the aforementioned description.

Figure 5:
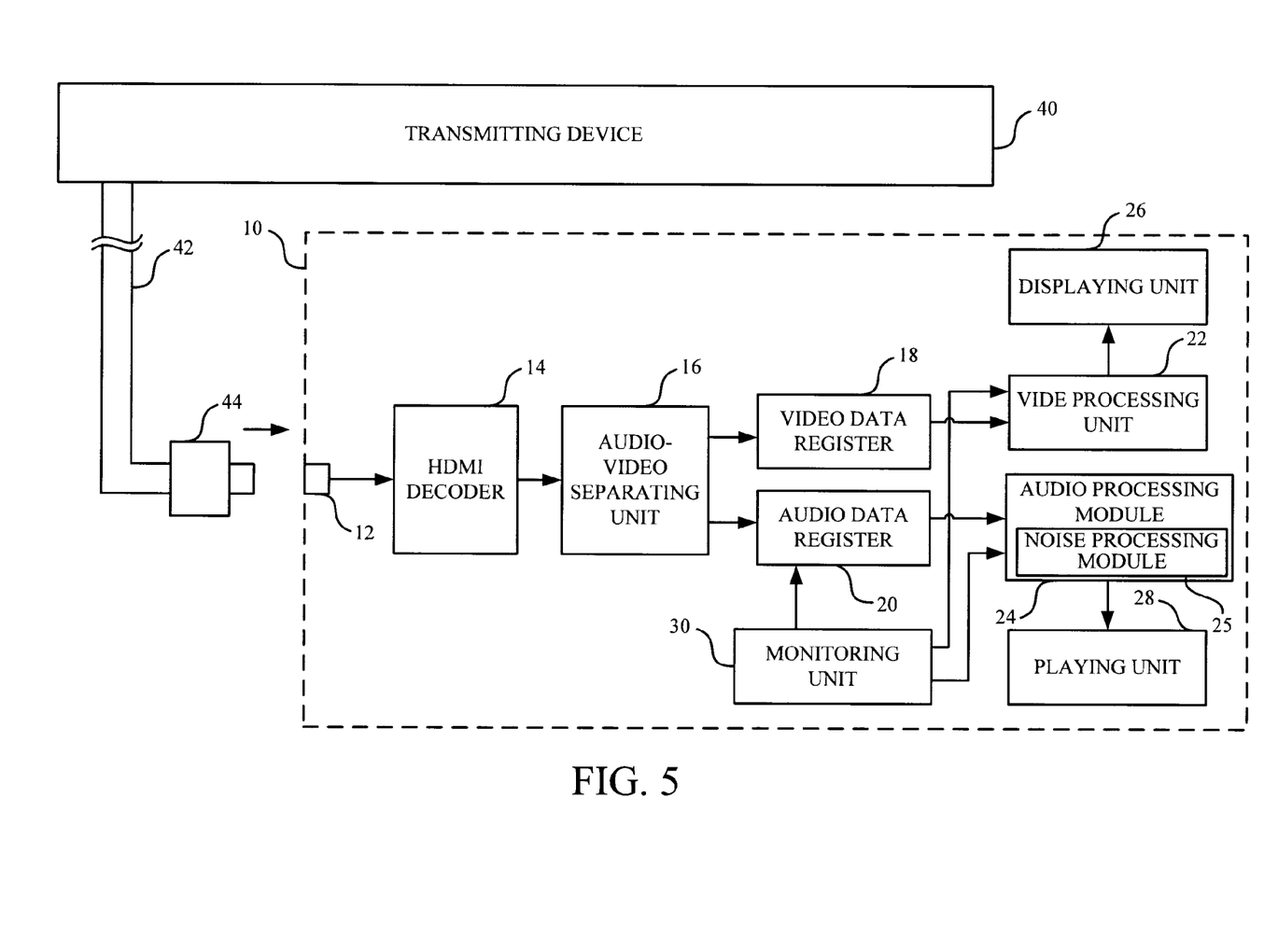
FIG. 5 shows a block diagram of yet another embodiment of the receiving device of the present invention.

FIG. 5 shows a block diagram of another embodiment of the receiving device of the present invention. The difference between the embodiments shown in FIGS. 5 and 4 lies in that the monitoring unit 30 shown in FIG. 5 detects the status of the audio data register 20 in determining whether the receiving device 10 receives the inputted signal. If the monitoring unit 30 detects that some addresses of the audio data register 20 are not occupied with audio data, the monitoring unit 30 will transmit a control signal to the video processing unit 22 and the audio processing module 24, to generate a corresponding video signal and a corresponding audio signal.

Figure 6:
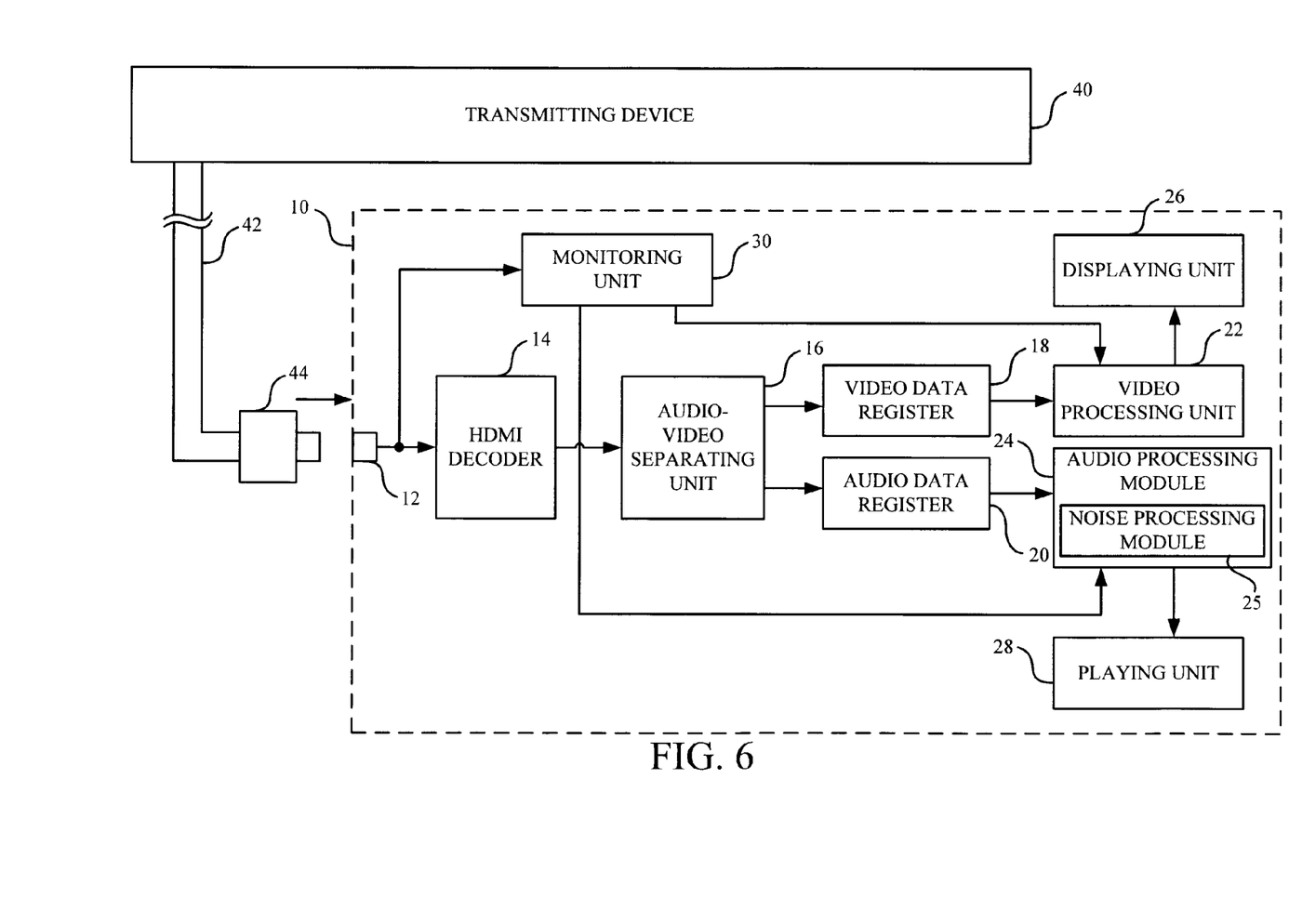
FIG. 6 shows a block diagram of yet another embodiment of the receiving device of the present invention.

FIG. 6 shows a block diagram of another embodiment of receiving device of the present invention. In this embodiment, the monitoring unit 30 determines whether the receiving device 10 is receiving inputted data by detecting whether the connector 12 is outputting a clock signal, data signal, or any other signal which varies its voltage level along time. The aforementioned signals can be the video signal corresponding to the video data or the audio signal corresponding to the audio data. If the monitoring unit 30 detects that the connector 12 fails to transmit the clock signal or the data signal, for example, by detecting that no voltage level change is incurred within a predetermined time frame or by detecting a floating level, the monitoring unit 30 will transmit a control signal to the video processing unit 22 and the audio processing module 24, to generate a corresponding outputted video signal and a corresponding outputted signal.

Figure 7:
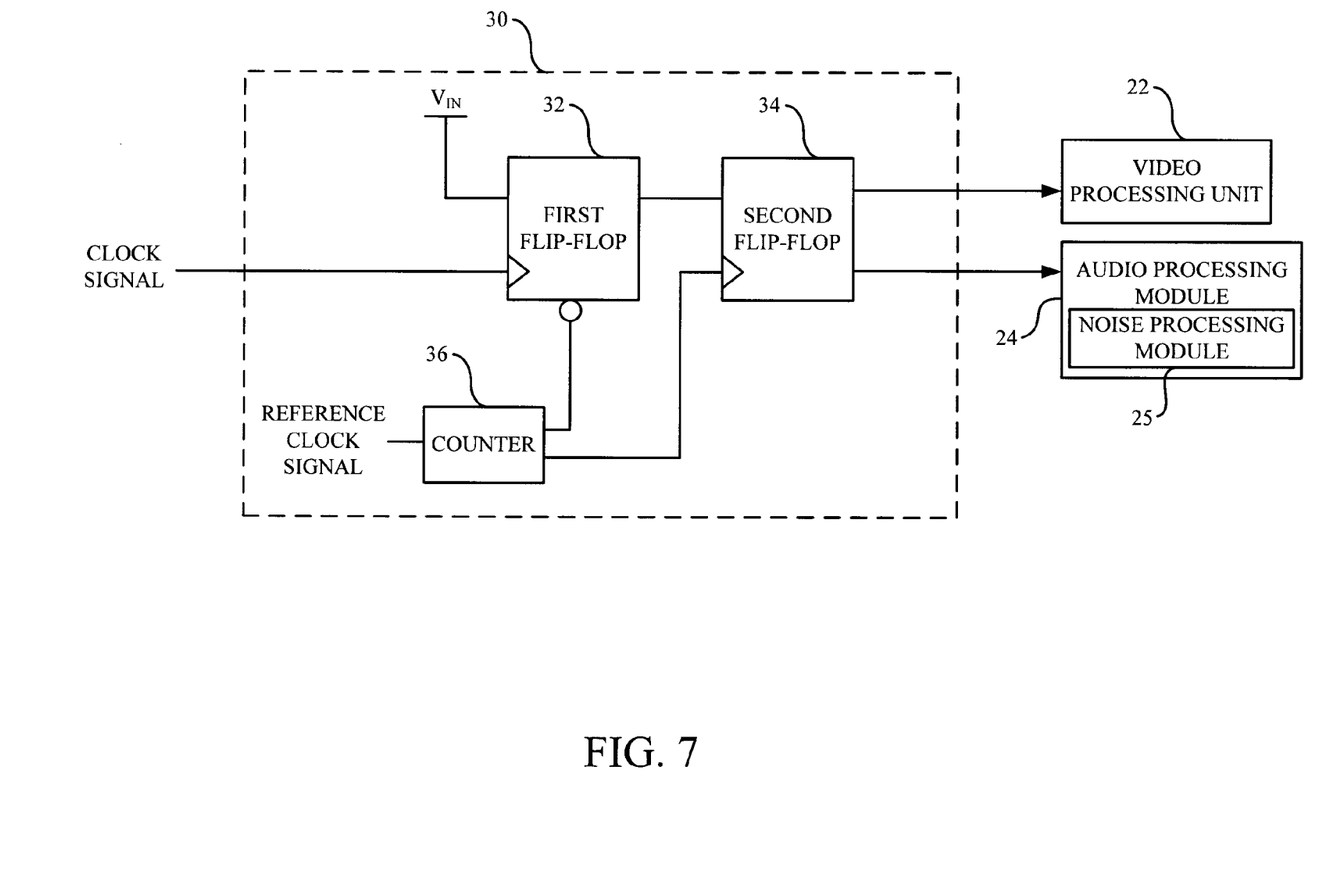
FIG. 7 shows a block diagram of an embodiment of the monitoring unit of the present invention.

FIG. 7 shows a block diagram of an embodiment of the monitoring unit of the present invention. The monitoring unit 30 detects whether the connector 12 is transmitting the clock signal (or the data signal) or not. In this embodiment, the detection of the clock signal by the monitoring unit 30 is illustrated as an example, but the present invention is not limited thereto. As shown in FIG. 7, the monitoring unit 30 includes a first flip-flop 32, a second flip-flop 34, and a counter 36. An input terminal of the first flip-flop 32 receives a fixed voltage level $V_{IN}$, a clock input terminal of the first flip-flop 32 receives the clock signal, and an output terminal of the first flip-flop 32 couples to an input terminal of the second flip-flop 34. An outputted signal from an output terminal of the second flip-flop 34 serves as a flag signal for notifying the detected result of the monitoring unit 30 to the video processing unit 22 and/or the audio processing module 24. In this embodiment, the first flip-flop 32 and the second flip-flop 34 are both D-type flip-flops. The counter 36 receives a reference clock signal, which is an internal clock signal of the receiving device 10. The counter 36 counts the reference clock signal and correspondingly generates a reset signal and a detecting clock signal, and transmits the reset signal and the detecting clock signal to a reset terminal of the first flip-flop 32 and the clock input terminal of the second flip-flop 34, respectively. The counter 36 generates the reset signal periodically.

As aforementioned above, when the connector 12 of the receiving device 10 is receiving the clock signal, the first flip-flop 32 is induced to output the fixed voltage level $V_{IN}$ to the input terminal of the second flip-flop 34. Furthermore, when the counter 36 finishes the counting and transmits the detecting clock signal to the clock input terminal of the second flip-flop 34, the second flip-flop 34 is induced to output the fixed voltage level $V_{IN}$ from the output terminal and to label the flag signal, which indicates that the input of the clock signal is normal. The counter 36 transmits the reset signal to the reset terminal of the first flip-flop 32 periodically to reset the first flip-flop 32. Contrarily, if the connector 12 of the receiving device 10 fails to receive the clock signal, the first flip-flop 32 will not output the fixed voltage level $V_{IN}$ to the second flip-flop 34. When the counter 36 finishes the counting and transmits the detecting clock signal to the clock input terminal of the second flip-flop 34, the output terminal of the second flip-flop 34 will not output the fixed voltage level $V_{IN}$ so that the flag signal will not be labeled, which indicates that the input of the clock signal becomes abnormal; as a result, the video processing unit 22 and the audio processing module 24 will generate the outputted video signal and audio signal correspondingly.

In summary, the receiving device of the audio-video system of the present invention uses the monitoring unit for detecting the status of the inputted signal received by the receiving device, to determine whether the receiving device receives the inputted signal. The monitoring unit can transmit the control signal to the video processing unit and the audio processing module, which enables the generation of the outputted video signal and the outputted audio signal, when the receiving device accidentally stops receiving the inputted signal. The abnormal image and noise can thus be prevented.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A receiving device for an audio-video system comprising:
   a connector for receiving an inputted signal, the connector adopts a standard of transmission interface with a serial link format to transmit digitized audio-video data;

a video processing unit for processing video data included in the inputted signal;

an audio processing module for processing audio data included in the inputted signal; and a monitoring unit for detecting a status of the inputted signal, transmitting a first control signal to control an operation of the video processing unit, and transmitting a second control signal to control an operation of the audio processing module, the first control signal and second control signal being transmitted in accordance with the detected status, wherein the monitoring unit detects a video signal corresponding to the video data in the inputted signal or an audio signal corresponding to the audio data in the inputted signal, wherein the monitoring unit detects a change of a voltage level in the inputted signal within a predetermined period;

wherein the audio processing module comprises a noise processing module for smoothing the audio signal to generate a continual audio signal in response to the monitoring unit detecting that the audio signal contains a discontinuous waveform, the noise processing module comprising:

a signal generating unit for receiving the second control signal from the monitoring unit and generating an adjusting signal based on the second control signal; and a determining unit for smoothing the audio signal according to the adjusting signal.

2. The receiving device as claimed in claim 1, wherein the monitoring unit detects a clock signal in the inputted signal.

3. The receiving device as claimed in claim 1, further comprising a decoder and an audio-video separating unit coupled between the connector and the video processing unit.

4. The receiving device as claimed in claim 1, wherein the standard of transmission interface conforms to High Definition Multimedia Interface standard.

5. The receiving device as claimed in claim 1, wherein the standard of transmission interface conforms to Display Port standard.

6. The receiving device as claimed in claim 1, wherein the standard of transmission interface conforms to Unified Display Interface standard.

7. A receiving device in an audio-video system, comprising:

a connector configured to receive an input signal, the connector being compatible with a standard of transmission interface with a serial link format for transmitting digitized audio-video data;

a video processing unit configured to process video data within the input signal;

an audio processing module configured to process audio data within the input signal; and a monitoring unit configured to monitor a connection status of a cable to the connector, the monitoring unit being further configured to control at least one of the video processing unit and the audio processing module responsive to the connection status, wherein the monitoring unit is further configured to detect a video signal corresponding to the video data in the input signal or an audio signal corresponding to the audio data in the input signal, wherein the monitoring unit is further configured to detect a change in a voltage level of the input signal occurring within a predetermined period of time;

wherein the audio processing module comprises a noise processing module for smoothing the audio signal to generate a continual audio signal in response to the monitoring unit detecting that the audio signal contains a discontinuous waveform; and wherein the monitoring unit is further configured to detect the voltage level of the input signal to determine if the voltage level is a floating level.

8. The receiving device as claimed in claim 1, wherein the determining unit of the noise processing module reduces a gain value of the audio signal based on the adjusting signal.

9. The receiving device as claimed in claim 8, wherein the determining unit comprises a multiplier.

10. The receiving device as claimed in claim 7, wherein the monitoring unit detects a clock signal in the input signal.

11. The receiving device as claimed in claim 7, further comprising a decoder and an audio-video separating unit coupled between the connector and the video processing unit.

12. The receiving device as claimed in claim 7, wherein the standard of transmission interface conforms to at least one of High Definition Multimedia Interface standard, Display Port standard, and Unified Display Interface standard.

13. The receiving device as claimed in claim 7, wherein the monitoring unit is configured to transmit a first control signal for controlling an operation of the video processing unit and a second control signal for controlling an operation of the audio processing module.

14. The receiving device as claimed in claim 7, wherein the noise processing module comprises:

a signal generating unit for receiving the second control signal from the monitoring unit and generating an adjusting signal based on the second control signal; and a determining unit for smoothing the audio signal according to the adjusting signal.

15. The receiving device as claimed in claim 14, wherein the determining unit of the noise processing module reduces a gain value of the audio signal based on the adjusting signal.

16. The receiving device as claimed in claim 15, wherein the determining unit comprises a multiplier.

* * * * *